March 16, 1937. J. P. GRAUL 2,074,177
ABRADING TOOL
Filed April 15, 1935
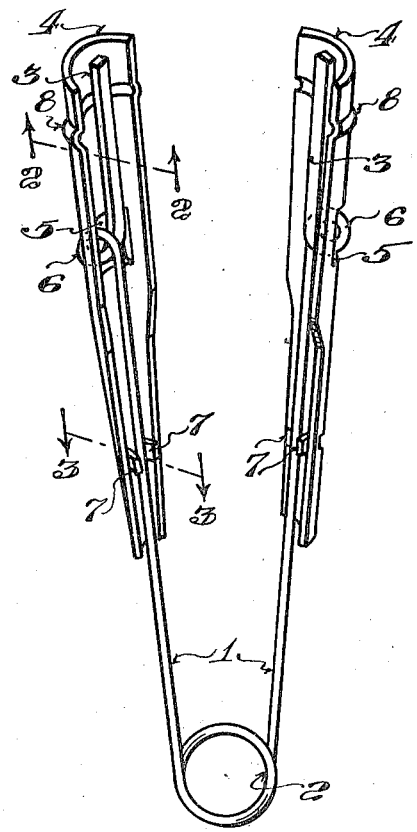
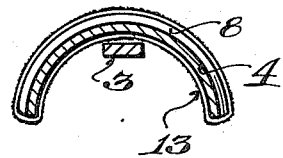
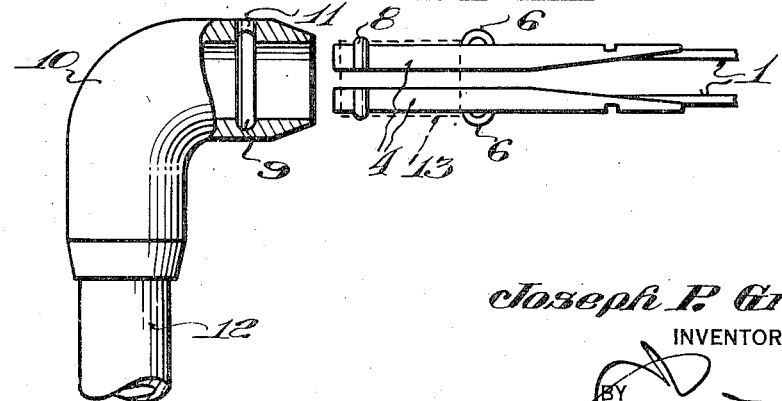
Joseph P. Graul
INVENTOR
BY
ATTORNEY Patented Mar. 16, 1937

2,074,177

UNITED STATES PATENT OFFICE 2,074,177

ABRADING TOOL

Joseph P. Graul, Dallas, Tex.

Application April 15, 1935, Serial No. 16,420

3 Claims. (Cl. 51—187)

This invention relates to tools for abrading surfaces and particularly to a tool for cleaning the interior surfaces of tubular bodies and fittings preparatory to sweating in component elements.

The principal object of the invention is to provide a tool of the character specified, adapted for use in connection with cleaning sweated fittings, preparatory to assembling air conditioning systems and in other uses where threadless joints are desirable or are found to be more practicable.

In brass and copper connections, corrosion on the surface of the fittings frequently hinders the effectiveness of the flux ordinarily used to obtain proper distribution of the solder which is employed to secure the joints. The present invention therefore provides a means by which foreign matter such as corrosion and the like may be removed from the surface of the fitting so that it will effectively receive the flux preparatory to soldering.

The invention particularly aims to provide a device for the specific purpose of preparing fittings which are usually provided with solder retaining grooves and is provided with means to clean these grooves of foreign matter as well as adjacent surfaces so that there will be no defect in the connection.

With the foregoing objects as paramount, the invention has particular reference to its salient features of construction and arrangement of parts which will become manifest as the description proceeds, taken in connection with the accompanying drawing, in which:—

Figure 1 is a perspective view of a tool embodying the elements of the present invention.

Figure 2 is a transverse section on lines 2—2 on Figure 1.

Figure 3 is a transverse section on lines 3—3 on Figure 1.

Figure 4 is a detail view partly in section of an elbow showing an interior annular groove for the reception of solder, and Figure 5 is an elevational view of the invention, with the handle portion broken away and the abrasive material shown in dotted lines.

Continuing with a more detailed description of the drawing, 1 designates a length of spring steel wire which is formed to provide a convolute 2 and whose free ends are flattened at 3. The purpose of the convolute or loop 2 is to relieve the strain upon the flexed portion of the handle 1 which otherwise would crystallize and break under continuous use. Moreover, this manner of forming the handle lends to its flexibility and insures at all times a uniform outward springing action of its free ends 3.

Fittings of the type shown in the drawing and briefly mentioned in the foregoing are generally used in air conditioning systems and in refrigeration systems through which is conveyed a refrigerating medium such as a refrigerating gas and the like and such fittings, due to the novel manner in which the elements are joined together are found to be quite practicable for this purpose. In order to properly clean the surface required to receive the solder or the flux, in event this is necessary, sand paper is found to be the more effective as an abrasive. For the more effective results, it is desirable that this sand paper be shaped to conform to the surface and for this purpose, a pair of convexed members 4 are provided and suitably secured to the free ends of the member 1.

The means by which the elements 4 are secured to the handle 1 consist of slots or apertures 5 which receive loops 6 provided in each prong of the handle member 1 to prevent rotation of the elements 4 thereon. At a point spaced below the aperture 5 in each of the elements 4, a pair of ears 7 are struck inward from the material of the said element to provide a clip into which is urged an intermediate portion of the prong of the handle 1 to provide a fastening medium by which the elements 4 are temporarily retained upon the said handle member 1. This method of fastening, combined with the said loop 6 is effective for both holding and preventing rotation of the said elements 4 on the said handle 1.

Adjacent the upper ends of the members 4 is a rib 8, which corresponds with the annular groove 9 in the elbow fitting 10 shown in Figure 4. Referring specifically to this fitting 10, it will be noted that an aperture 11 is provided which communicates with the said annular groove 9. A stick of solder is inserted in this aperture 11 after a joint of pipe 12 is inserted into the elbow and with a blow torch or other heating element is applied to the elbow, a fusion of the solder takes place between the fittings around the groove 9 and a firm connection is established thereby.

Referring again to Figures 2 and 5, a strip of abrasive material 13 is affixed to the convex elements 4 in the manner shown in Figure 2 and which abrasive material is preferably sand paper when the device is used as a tool for abrading surfaces adapted to receive solder. The ends of the strip of sand paper are secured under and held by the flattened ends 3 of the handle member 1. It is apparent that application of these strips of abrasive material may be applied readily to each of the members 4 and the outward springing action of the arms of the handle member 1 will cause the convex surfaces of the elements 4 to bear snugly against the inner surface of the fitting 10 and by rotating the tool, the said inner surface of the fitting may be thoroughly cleansed of any adhering foreign matter.

In addition to the cleaning action above referred to as regards the common inner surface of the fitting, the annular groove 9 is likewise cleansed of any foreign matter by virtue of the protruding rib 8 formed in each of the elements 4. This rib will urge the abrasive material into the groove 9 and when rotation is imparted to the tool, any foreign matter or corrosive substance which has accumulated in the groove will be removed preparatory to receiving the solder, which will then be free to become distributed throughout the groove and thereby insure a thorough connection.

It will be understood that all sweat fittings are not necessarily provided with grooves such as at 9 and that the rib 8 of the elements 4 of the invention may be accordingly eliminated without departing from the invention. Moreover, other changes and modifications may be resorted to from time to time without departing from the spirit or intent of the invention as set forth in the following claims therefor.

What is claimed is:

1. A tool for abrading the inner surfaces of tubular bodies comprising a pair of resilient arms constrained to move normally outward and having oppositely disposed loops adjacent their ends, a pair of semi-cylindrical members, arranged to be mounted on said arms, each having apertures to receive the loops in said arms to hold them against rotation thereon, said members being constructed to retain a strip of abrading material to conform to the interior of a tubular body, and means carried by said members to frictionally engage said arms to hold the said members in operative position to said arms.

2. A tool for polishing the interior of tubular bodies preparatory to the insertion of a complementary element, comprising a resilient body, looped to provide arms of equal length and resiliency, said arms having projections adjacent their extremities, a pair of members curved along their major axes and provided with apertures to conformably receive said projections to hold said members against rotation on said arms said members and arms being arranged to jointly retain a strip of abrasive material, and means carried by said members for removable engagement with said arms to hold the said members operatively on said arms.

3. A tool of the type described in claim 2 in which the curved members are each provided with a transverse outward corrugation spaced from their operative ends.

JOSEPH P. GRAUL.